TIME DIVISION MULTIPLEX SYSTEM

Filed Dec. 20, 1962

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

April 5, 1966 S. M. SCHREINER 3,244,813

TIME DIVISION MULTIPLEX SYSTEM

Filed Dec. 20, 1962 11 Sheets-Sheet 4

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT

INVENTOR.
STANLEY M. SCHREINER
BY Alfred C. Hill
AGENT 3,244,813

TIME DIVISION MULTIPLEX SYSTEM

Stanley M. Schreiner, Nutley, N.J., assignor to International Telephone and Telegraph Corporation, Nutley, N.J., a corporation of Maryland Filed Dec. 20, 1962, Ser. No. 246,181
10 Claims. (Cl. 179—18)

This invention relates to time division switching systems and especially to the so-called "grid" systems using digital techniques.

One of the objects of the invention is to provide a switching system which operates on digital time division basis.

Another object of the invention is to provide a digital switching system which will have fewer components and in which the circuit arrangement is simpler.

Another object of the invention is to provide a digital switching system in which there is a single memory device in each line unit, these being the only memory devices required in the system.

Still another object of the invention is to provide a time-division switching system in which the lines are divided into groups and a line unit is provided for each line, each line unit being settable to transmit signals during the time of any other group and at the time position of any line in that group.

A further object of the invention is to provide an operating control unit with a switching matrix for setting the line units.

The above-mentioned and other features and objects of this invention and the manner of attaining them will become more apparent, and the invention itself will be best understood, by referring to the following description of an embodiment of the invention taken in conjunction with the accompanying drawings in which.

Figure 4:
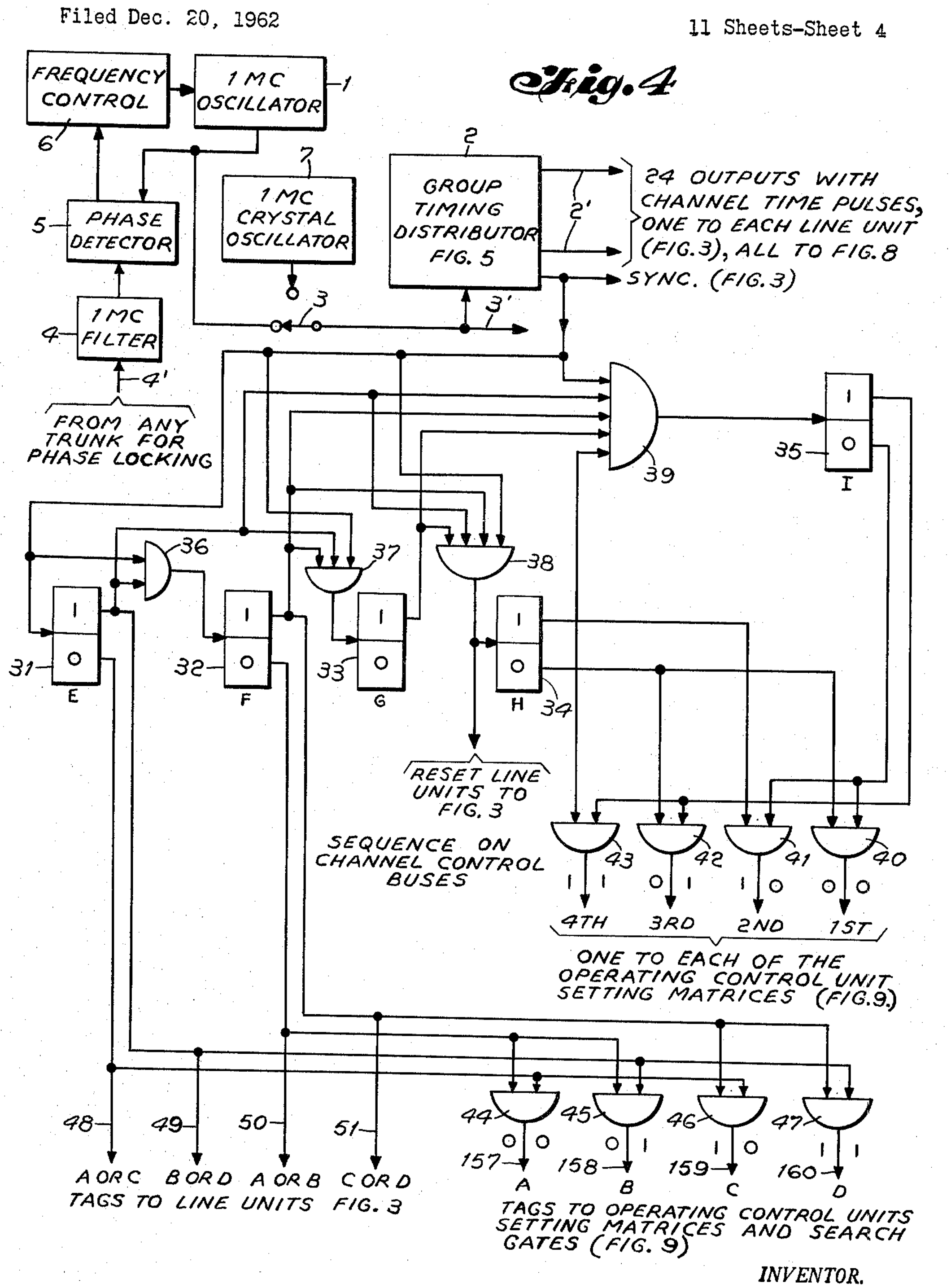
FIG. 4 is a circuit diagram of a master clock which is used for controlling all of the circuits of the invention.
Figure 8:
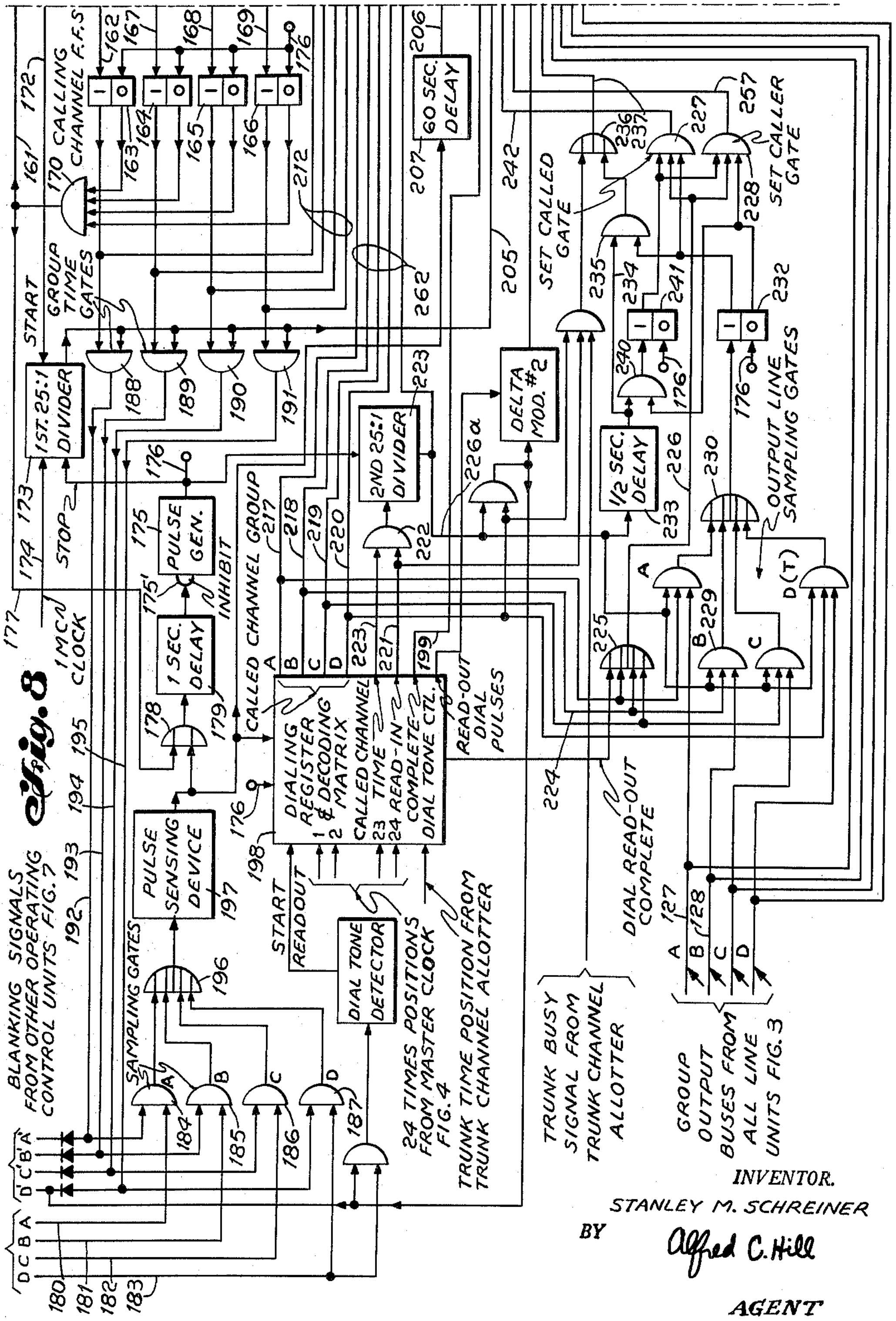
Figure 9:
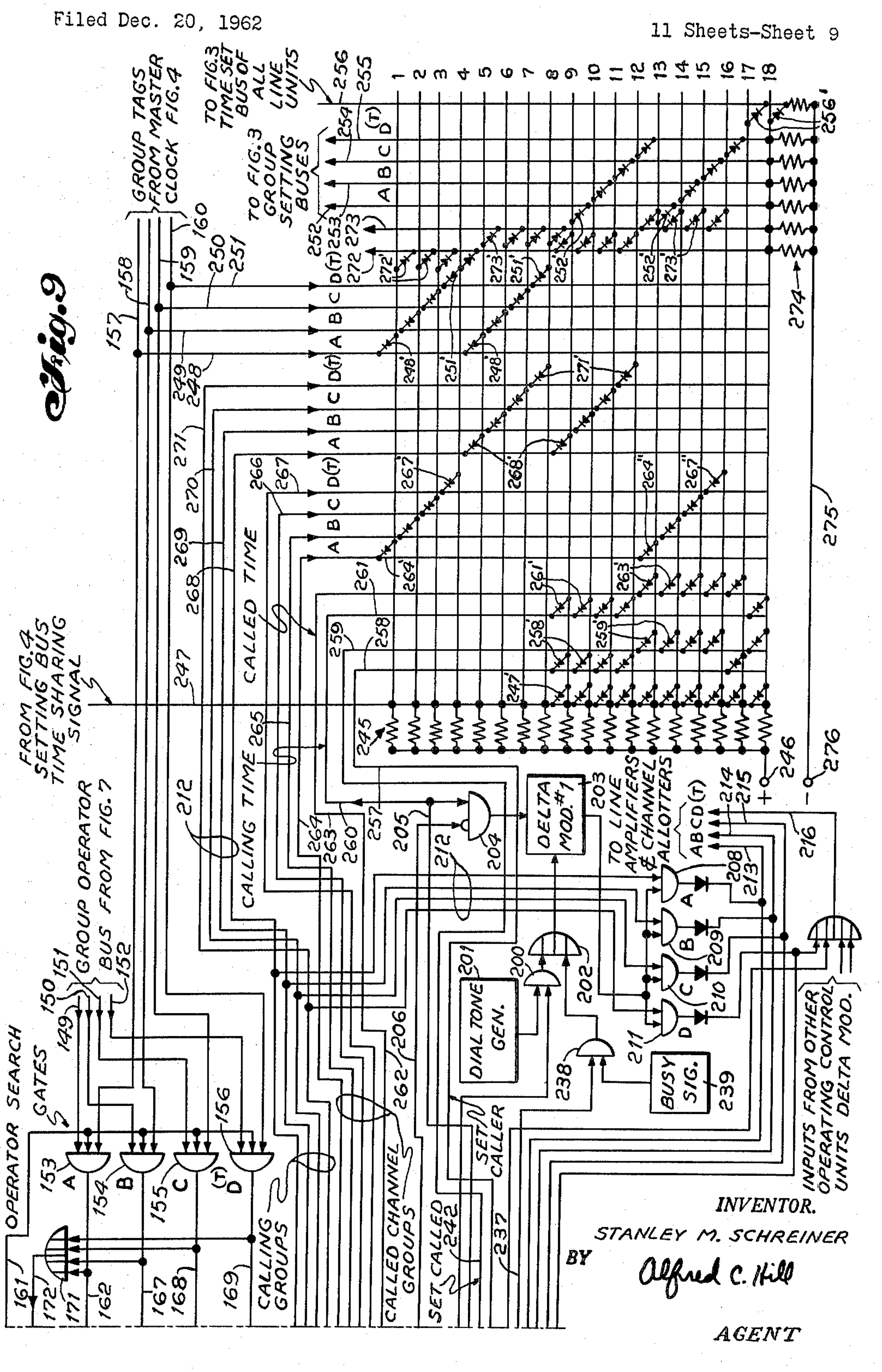
Figure 10:
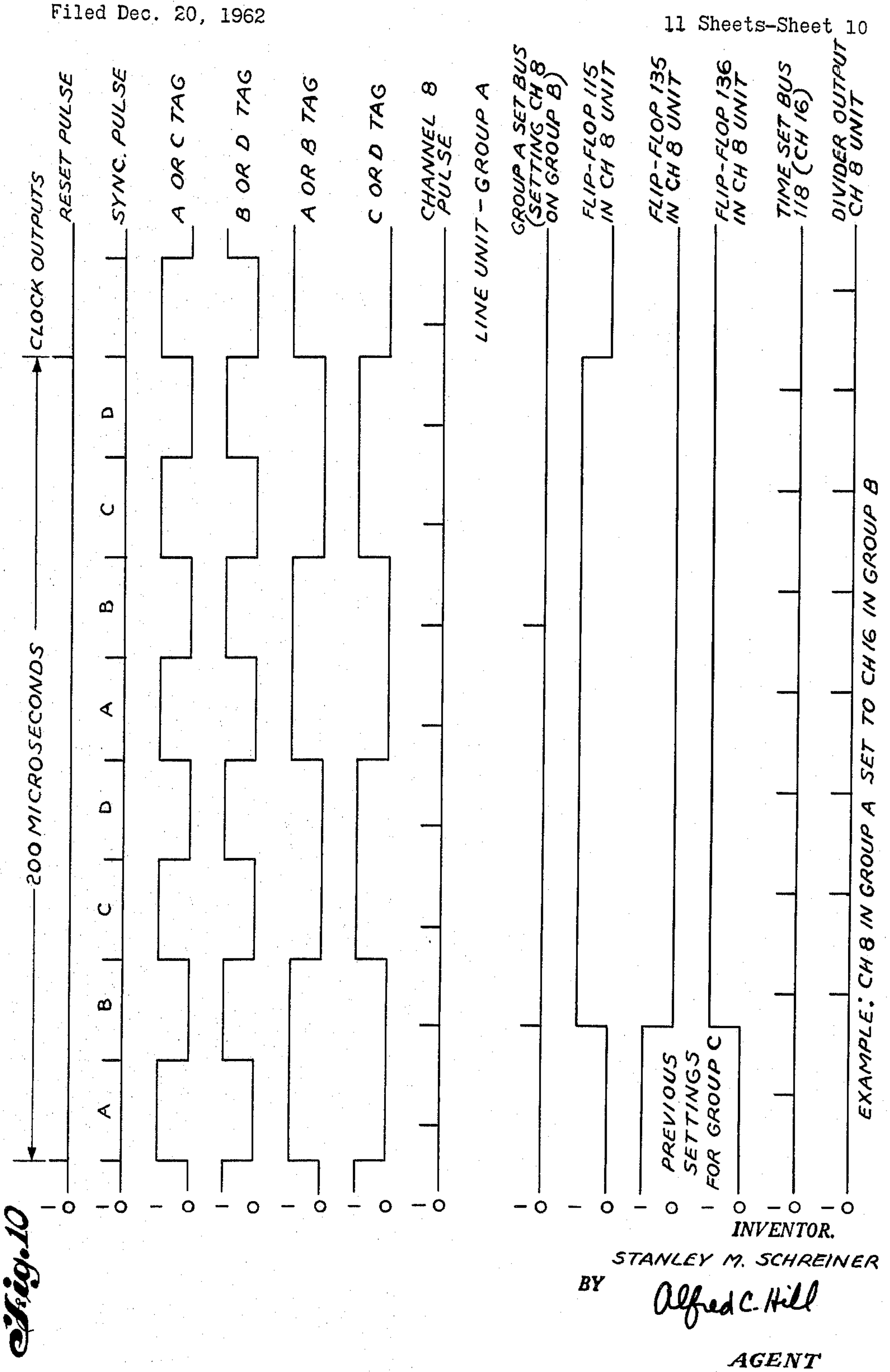
Figure 11:
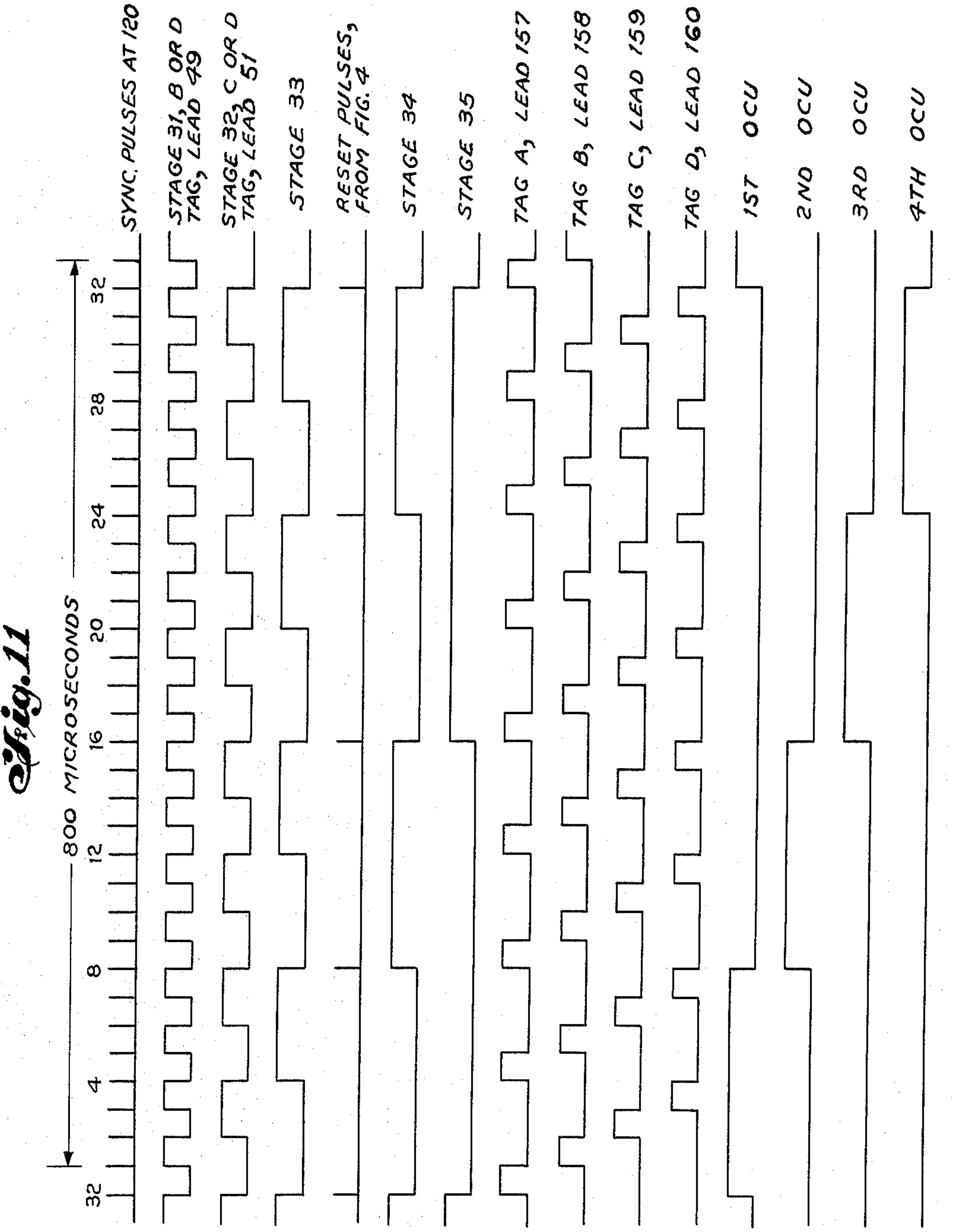

FIGS. 8 and 9, when placed with FIG. 8 to the left of FIG. 9, are a circuit diagram of one of the operating control units;

FIG. 10 is a timing diagram for the line during one cycle of an operating control unit when such operating control unit is controlling the line unit; and FIG. 11 is a waveform diagram of frame interval outputs of the master clock of FIG. 4.

The invention is especially applicable to the so-called grid time-division switching system in which the lines are divided into groups, each group communicating with other groups over a single cable, the signals on that cable being a framing or synchronizing pulse and a plurality of spaced information pulses, representing channels, there being one channel for each telephone in the group.

Such a system comprises drop-channel facilities, repeaters, trunk channel allotters and other equipments which are known and form no part of the present invention. The description, therefore, will be limited to the features considered to be novel.

At the switching facility, which is a particular feature of the invention, each user's telephone is allotted a time position in a repetitive cycle of time positions and each telephone is provided with a line unit which may be set by an operating control unit to transmit the signal of its associated telephone at the time position of a called party and during a time allotted to the group in which the telephone of the called party is situated. This setting is accomplished by one of a number of operating control units. The line unit of the calling party having been set to the particular group and time position of the called party, the line unit of the called party is then set to the particular group and time position of the calling party. When these two units have been set, the operating control unit is released for use by other calling lines.

Each switching facility may have a number of groups of lines, four groups being shown in the present illustrative example. These switching facilities are connected by cables with all of the other switching facilities, there being a single cable for each group of lines. Each switching facility has its own master clock for controlling the operation of the various units associated with it and for assigning a particular time position in a group frame to each of the lines in that group. Arrangements are provided for synchronizing the master clocks in all of the switching facilities.

Referring now to FIG. 4 of the drawings, a circuit diagram of a master clock for one of these switching facilities is shown. This clock comprises a one megacycle oscillator 1 which feeds a group timing distributor 2 through a suitable switch 3. The oscillator 1 may be locked in phase with the other similar oscillators of other switching facilities by means of a phasing signal received over lead 4' from any trunk. This signal is delivered to a one megacycle filter 4 which eliminates any extraneous signal and delivers the phasing pulse to a phase detector 5 which controls a frequency control device 6 connected to the oscillator 1. Thus, the phase locking signal from the trunk will lock the oscillator 1 to the same phase.

If desired a crystal oscillator 7 may also be provided and may be used for controlling the group timing distributor 2 by shifting the switch 3, in which case, the clock would be controlled solely by the crystal oscillator.

The group timing distributor 2 is arranged to produce a separate output pulse for each channel or time position in the repetitive pulse frame. These pulses are applied to separate leads 2', there being one for each line unit in the group. In the arrangement illustrated, there are 24 of these channels, and, hence, 24 leads will be multiplied to all of the operating control units, as will be later described. In addition, the group timing distributor will produce a one megacycle synchronizing pulse train which will be applied over the lead labled "SYNC" to all of the line units in the switching facility.

Figure 5:
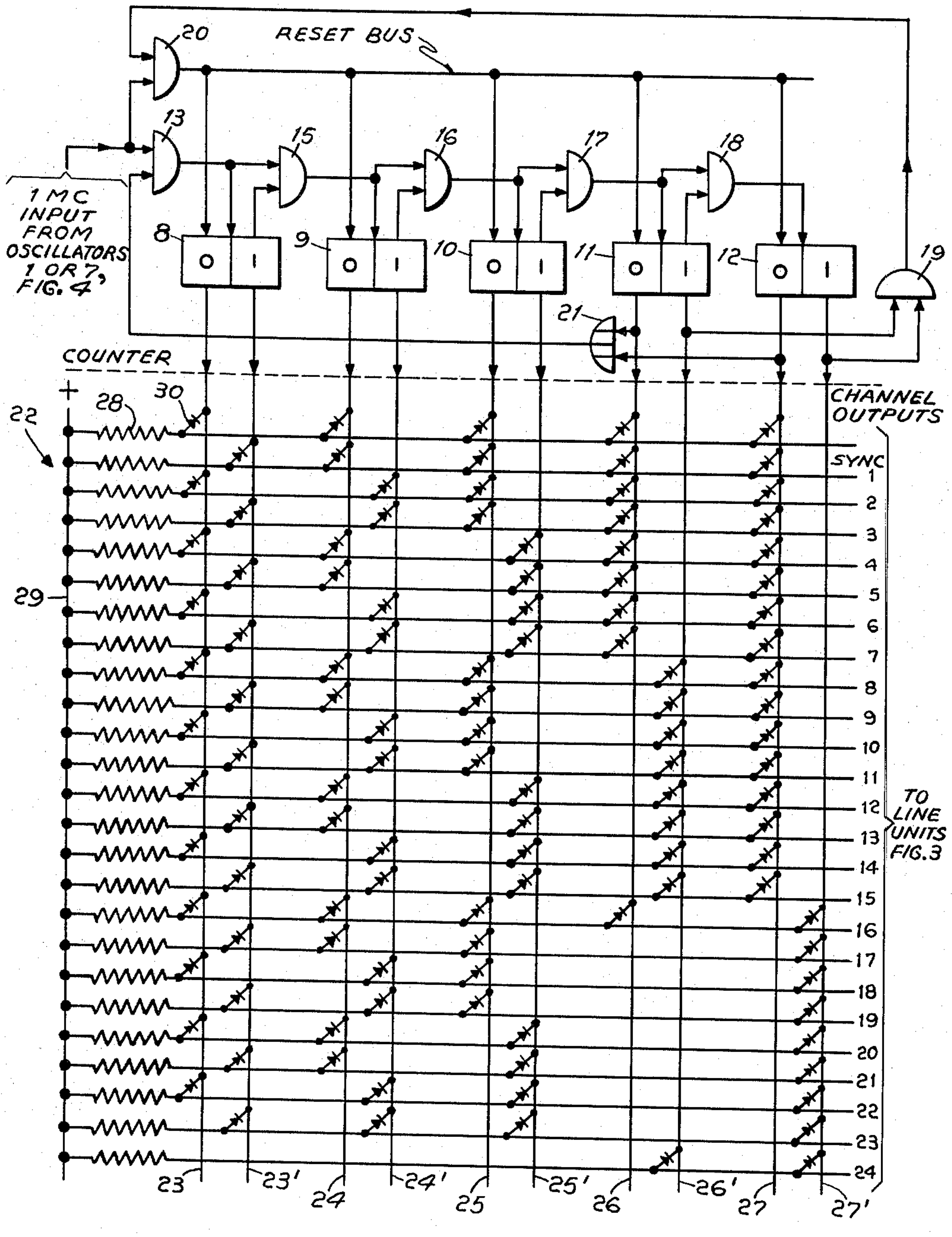
FIG. 5 is a detailed digram of the group timing distributor shown in the master clock of FIG. 4.
Figure 6:
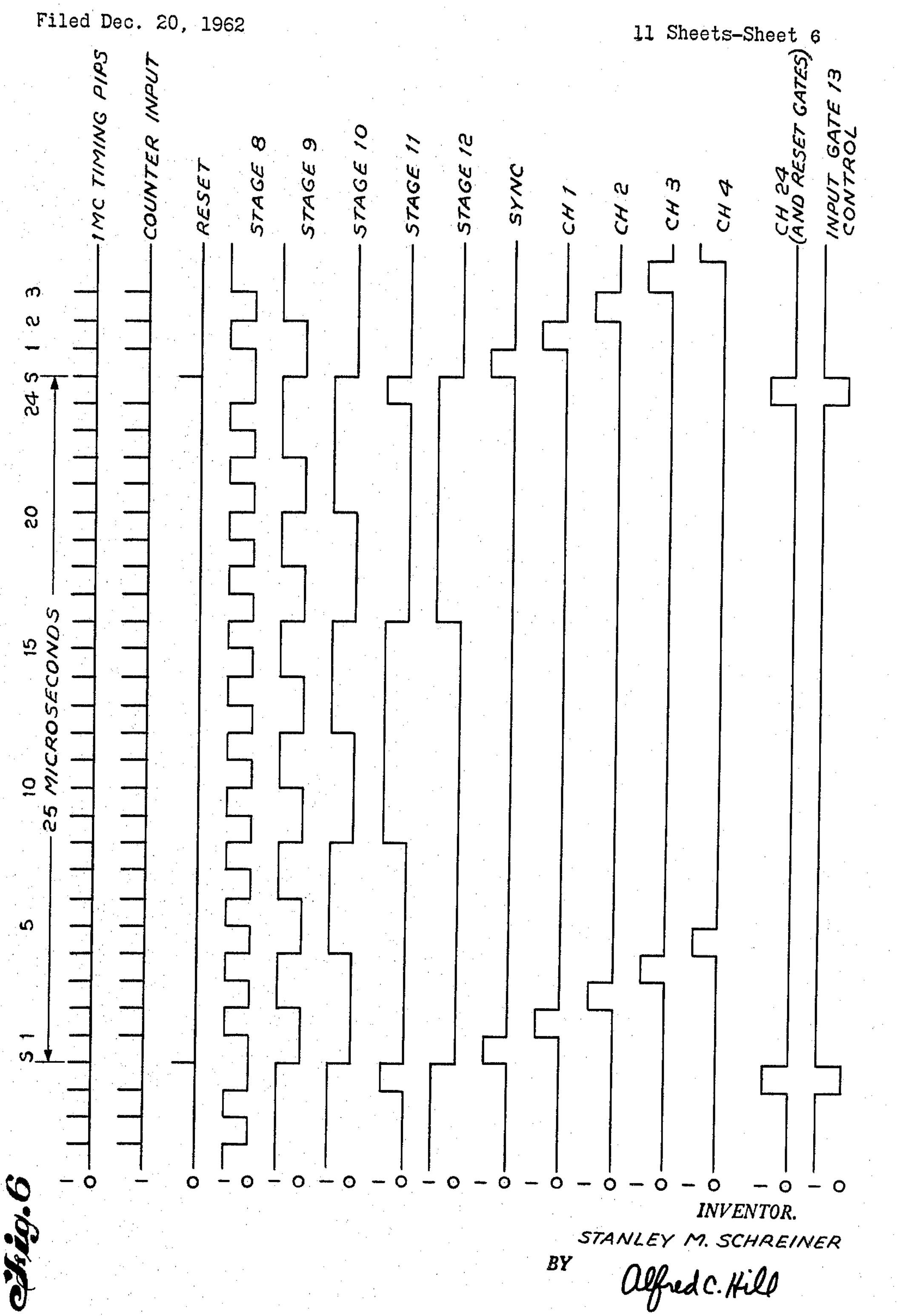
FIG. 6 is a waveform diagram showing waveforms relating to the counter and group timing distributor of FIG. 5.

The group timing distributor is shown in more detail in FIG. 5. It comprises a binary counter having five stages 8 to 12, each of which is a flip-flop. Since there are 24 separate time position outputs and one synchronizing output, the counter is arranged to make 24 steps and then return to normal condition on the 25th step. Ordinarily five flip-flops arranged in a binary counter will need 32 pulses to cause it to return to its original condition and, hence, a special arrangement is provided to cause the circuit to return to normal on the 25th pulse. Each flip-flop is connected in a well known manner so that when the input lead is energized, the flip-flop will shift to the other condition, regardless of which condition it was in at the time the pulse was received. This input is indicated as the center lead. The lead on the left, when energized, will shift the flip-flop to the "0" condition if it is not already in that condition. In each case, an output is produced when the flip-flop is in the "1" condition.

For operating the binary counter, the one megacycle pulse from one of the oscillators 1 and 7 is applied to an AND gate 13. The output of this AND gate 13 is applied to the central input of the flip-flop 8 and also to an AND gate 15; the other input of which is supplied by the flip-flop 8 in the "1" condition. The output of the AND gate 15 is applied to the central input of the flip-flop 9 and also to one input of an AND gate 16, the other input of which is supplied from the output of the flip-flop 9 in the "1" condition. In like manner, the output of the AND gate 16 is applied to one input of an AND gate 17 and also to the center input of the flip-flop 10, the other input of the AND gate 17 being supplied by the flip-flop 10 in the "1" condition. Similarly, the output of the AND gate 17 is applied to the center input of flip-flop 11 and to one input of an AND gate 18, the other input of which is supplied by the flip-flop 11 in the "1" condition. The output of the AND gate 18 is applied to the center input of the AND gate 12.

With the flip-flops 8–12 connected in this manner, they will count in a binary fashion and at the end of the 24th input pulse, the five stages will register 11000, reading from right to left, which is binary 24. The outputs from flip-flops 11 and 12 in the "1" condition are applied to an AND gate 19 which is, therefore, opened only when both flip-flops 11 and 12 are in the "1" condition. This occurs only when the counter has registered the binary number 11000. At this time, the AND gate 19 will produce an output which is applied to one input of an AND gate 20, the other input of which is connected to the input circuit to which is applied the train of pulses from one of the oscillators 1 and 7. On the next incoming pulse, therefore, the AND gate 20 will open and will apply a potential to all of the flip-flops 8 to 12 to shift them all to the "0" condition. In this way the counter will always count to 24 and then return to "0" on the 25th pulse.

When the flip-flops are returning to "0," it is necessary to prevent the flip-flops from being affected by an input pulse, and, hence, the second input to the AND gate 13 is supplied by the output of an OR gate 21 which is opened by either of the flip-flops 11 or 12 being in the "0" condition. This would happen at all times except when both flip-flops are in the "1" condition; hence, the AND gate 13 is enabled at all times except when the counter registers 11000.

The distribution of pulses to the channels is accomplished by means of a rectifier matrix 22, controlled by the counter stages 8 to 12. As shown, the matrix has 10 vertical wires connected in pairs to two outputs each of the flip-flops 8 to 12. Thus, the first vertical wire 23 is connected to the "0" output of the flip-flop 8, while the vertical wire 23′ is connected to the "1" output of the flip-flop 8. Similarly, the vertical wires 24, 24′, 25, 25′, 26, 26′, 27, and 27′ are connected respectively to the "0" and "1" outputs of flip-flops 9 to 12.

The 25 horizontal wires are designated "SYNC" and "1" to "24" inclusive. Each of these horizontal wires is connected over a resistor, indicated at 28, to a common lead 29 connected to a source of positive potential. The vertical wires are connected to combinations of the horizontal wires over diodes designated at 30; such connections being in a well known binary manner. Thus, vertical wire 23 is connected to the even numbered horizontal wires and to the synchronizing wire SYNC over individual diodes, while the vertical wire 23′ is connected to the odd numbered horizontal wires over diodes. The vertical wire 24 is connected by means of separate diodes to horizontal wires SYNC and 1, 4 and 5, 8 and 9, etc., while the vertical wire 24′ is connected over separate diodes to horizontal wires 2 and 3, 6 and 7, 10 and 11, etc. Vertical wire 25 is connected by means of separate diodes to horizontal wires SYNC, 1, 2, and 3; 8, 9, 10 and 11, etc., while vertical wire 25′ is connected over separate diodes to horizontal wires 4, 5, 6 and 7; 12, 13, 14, and 15, etc. Vertical wire 26 is connected over separate diodes to horizontal wires SYNC and 1 to 7 inclusive and 16, while vertical wire 26′ is connected over separate diodes to horizontal wires 8 to 15 inclusive and 24. In like manner, vertical wire 27 is connected over separate diodes to all of horizontal wires SYNC and 1 to 15, while vertical wire 27′ is connected over separate diodes to horizontal wires 16 to 24 inclusive.

With this arrangement, as is well known, any horizontal wires will be energized with a positive potential whenever all of the diodes connected to it are blocked by potentials on the vertical wires connected to them. Thus, as the counter counts, horizontal wires will be successively energized and the matrix will produce a separate pulse on a separate horizontal wire for each time position from 1 to 24, and these pulses will be synchronized with the oscillator 1 or 7 of FIG. 4.

These individual 24 wires and the synchronizing wire are connected to the operating control units serving the switching facility in a manner to be later described.

Referring to FIG. 4, the output SYNC containing the synchronizing pulse is delivered to a five stage counter containing flip-flops 31 through 35. The purpose of this counter is to produce operating potentials for the purpose of energizing the operating control units in succession and also to produce potentials on combinations of leads which are used to select and set the line units.

The five flip-flops 31 to 35 are connected as a binary counter, similarly to the connection of the flip-flops 8 to 12 of FIG. 5. Each has a center input which will shift the flip-flop to the other condition from that at which it was when the shift pulse arrived. The center input of the first flip-flop 31 is connected directly to the SYNC lead of the group timing distributor 2. This SYNC lead is also connected to one input of a two-input AND gate 36 whose other input is connected to the output of the flip-flop 31 from its "1" condition. The output of the AND gate 36 is connected to the central input of flip-flop 32. The output of the flip-flop 32 from its "1" condition is connected to one input of a three-input AND gate 36 whose other input is connected to the outthe SYNC lead of distributor 2 and a third input connected to the "1"-condition output of flip-flop 31. The output of the flip-flop 33 from its "1" condition is connected to one input of a four-input AND gate 38, another input of which is connected to the SYNC lead of distributor 2, a third input being connected to the "1"-condition output of flip-flop 31, and a fourth input being connected to the "1"-condition output of flip-flop 32. The output of the flip-flop 34 from its "1" condition is connected to one input of a five-input AND gate 39, another input of which is also connected to the SYNC lead of distributor 2, a third input being connected to the "1"-condition output of flip-flop 31, a fourth input being connected to the "1"-condition output of flip-flop 32, and the fifth input being connected to the "1"-condition output of flip-flop 33. The output of the gate 39 is connected to the central input of the flip-flop 35.

The flip-flops 34 and 35 are arranged to control four AND gates 40, 41, 42 and 43 which produce outputs in a time sequence to enable four operating control units successively, as will be later described. The output of flip-flop 34 in the "1" condition is applied to one input of each of AND gates 41 and 43, while the output of flip-flop 34 in the "0" condition is applied to one input of each of AND gates 40 and 42. The output of flip-flop 35 in the "1" condition is applied to the other inputs of AND gates 42 and 43, while the output of flip-flop 35 while in the "0" condition is applied to the other inputs of AND gates 40 and 41.

Another set of four AND gates 44, 45, 46 and 47 are provided to produce a succession of four waveforms to identify four groups of line units. These AND gates 44, 45, 46 and 47 are connected to the outputs of the first two flip-flops 31 and 32 in a manner similar to the connection of the gates 40 to 43. Thus, the flip-flop 31 in the "0" condition is connected to one input of each of AND gates 44 and 46, while the output of the flip-flop 31 in the "1" condition is connected to an input of each of AND gates 45 and 47. The output of flip-flop 32 in the "0" condition is connected to the other inputs of AND gates 44 and 45, while the output of the flip-flop 32 in the "1" condition is connected to the other inputs of gates 46 and 47. The outputs of gates 44 to 47 are multiplied to the four operating control units.

In addition to the above connections, the first two flip-flops 31 and 32 are connected to individual tags 48, 49, 50 and 51 which lead to all the line units associated with the switching facility and control the selection of the group-identifying time during which the line unit is to transmit. Lead 48 is energized when the flip-flop 31 is in the "0" condition. Lead 49 is energized when the flip-flop 31 is in the "1" condition. Lead 50 is energized when flip-flop 32 is in the "0" condition. Lead 51 is energized when the flip-flop 32 is in the "1" condition. Lead 48 has been designated "A or C" because when it is energized either the A group or the C group may be selected. Leads 49, 50 and 51 are designated respectively "B or D," "A or B," and "C or D" to indicate the possible selection of the noted groups when energized.

With the circuit arrangement, as shown in FIG. 4, the gates 44 to 47 will operate successively and in a repetitive cycle. The gates 40 to 43 will operate successively, but at a slower rate, each of the gates 40 to 43 producing a potential for one cycle of the gates 44 to 47. The leads 48 to 51 will be energized in combinations. Leads 48 and 50 will be energized when the first two flip-flops are in their "0" condition and thereafter 49 and 50 will be energized for the next pulse, 48 and 51 for the next pulse, 49 and 51 for the next pulse, and so on. The manner in which these different potentials will control the other units of the circuit will be described later.

Figure 1:
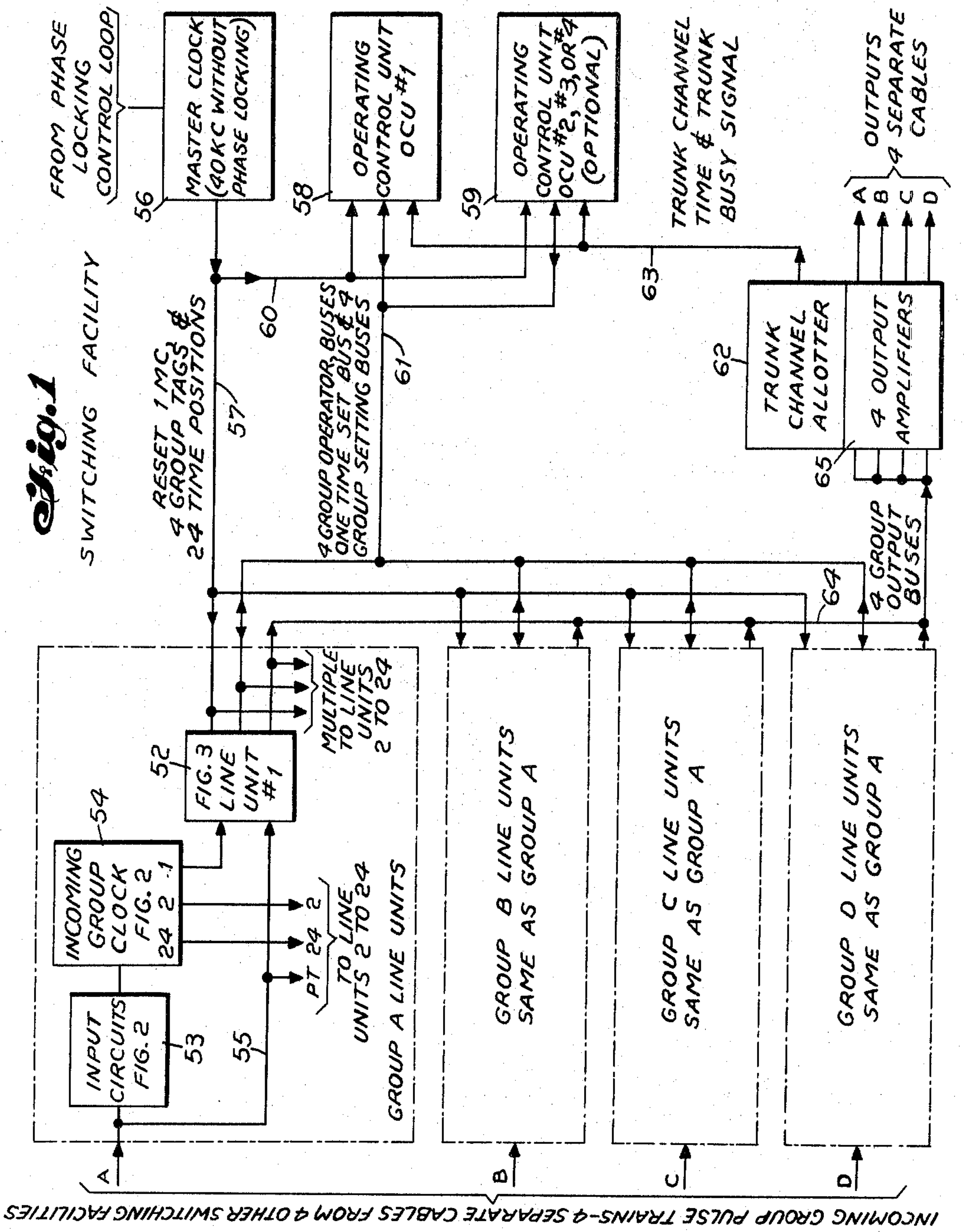
FIG. 1 is a block diagram of a switching facility incorporating the invention.

Referring now to FIG. 1 of the drawing, a block diagram of the whole switching facility is shown. The lines and line units have been shown as grouped into four groups, A, B, C and D. Each of these groups is connected by means of a separate cable to four other switching facilities. Each group contains 24 line units of which one is indicated at 52 in group A. The cable is connected at the input to input circuits 53 which in turn are connected to an incoming group clock 54 which has 24 outputs each connected to one of the line units, line unit number 1 being represented. A lead 55 also connects the incoming cable to each of the line units individually to supply the incoming group pulse train from a calling telephone as well as the user's telephone.

All of the other groups B, C and D are similar to the arrangement of group A.

The facility is provided with the master clock 56, shown in detail in FIGS. 4 and 5, and already described, and this clock is connected to all of the line units in all of the groups over a plurality of leads comprising a reset lead providing pulses at one megacycle, four group tags from the leads 48 to 51 of FIG. 4, and 24 time position leads from the horizontal wires 1 to 24 of FIG. 5. These leads are indicated by the single lead 57.

A plurality of operating control units are provided for each switching facility. Two of these, 58 and 59, are shown in the figure. The master clock is connected to all of the operating control units over a plurality of leads comprising the 24 time-position leads from horizontal wires 1 to 24 of FIG. 5, a reset lead, and four setting tags from the gates 40 to 43 of FIG. 4, all indicated by the single lead 60. The operating control units are also connected to all of the line units over all of the four groups in the facility by four group operator buses, one time set bus, and four group setting buses, all indicated by the single lead 61.

A trunk channel allotter 62 is provided at each facility for allotting a trunk to a call going to another facility. The trunk channel allotter is connected to all of the operating control units of the facility over leads indicated by the single lead 63. The trunk channel allotter will not be described in detail since it forms no part of the present invention.

The line units of all of the groups are connected over four group output buses indicated by the single lead 64 to four output amplifiers, indicated at 65, for feeding four separate cables indicated at the lower right hand corner of the figure at A, B, C and D.

Figure 2:
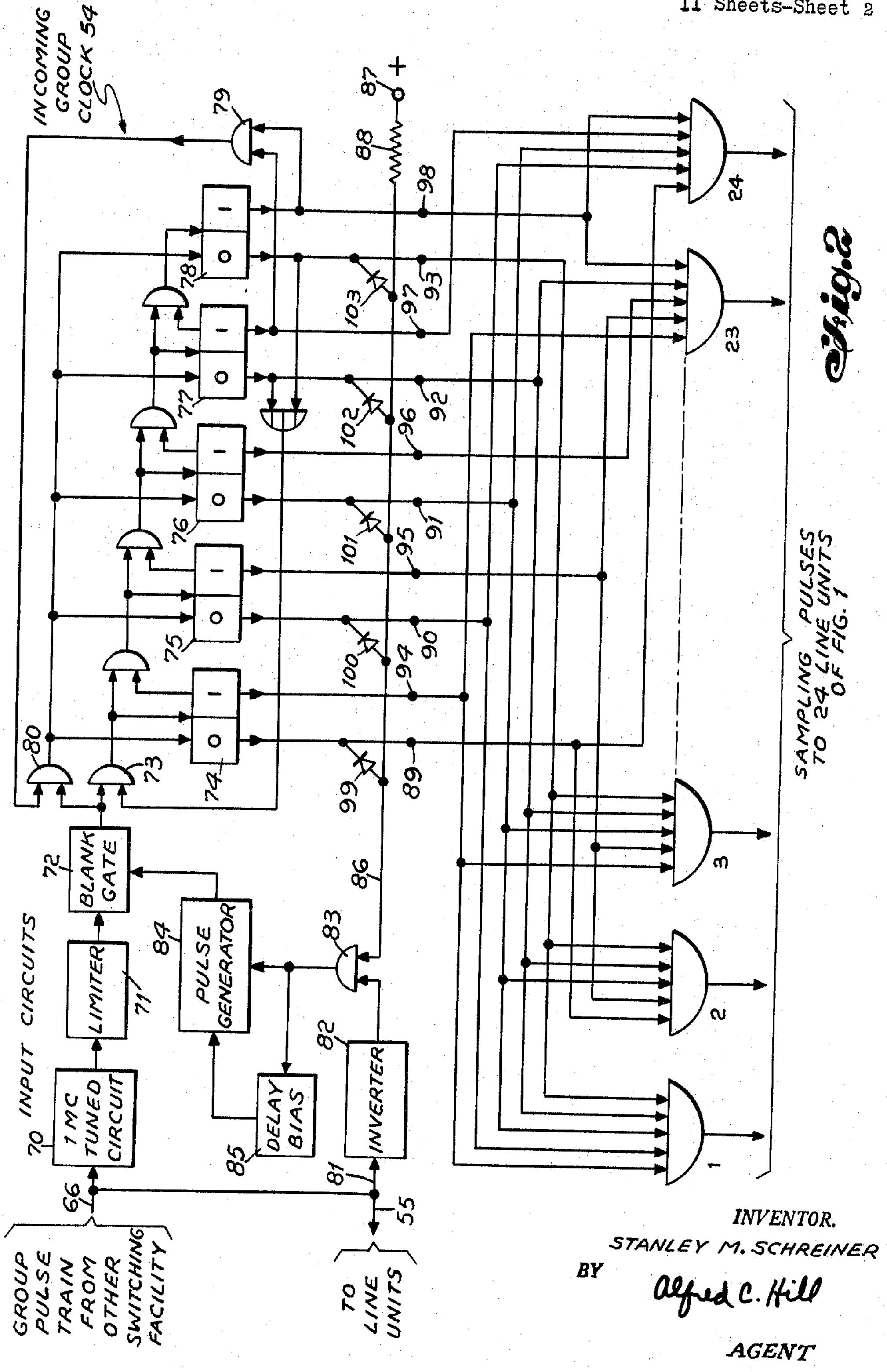
FIG. 2 is a circuit diagram of the input circuits and the incoming group clock of one of the line groups shown in FIG. 1.

The input circuits 53 of FIGURE 1 and the incoming group clock 54 are shown in detail in FIGURE 2. Referring to that figure, the input circuits for the group A units comprise an input terminal 66 which is connected to all of the 24 line units 52 of Group A over lead 55.

The input terminal 66 is also connected to a one megacycle tuned circuit 70 which will oscillate at the repetition frequency of the pulse train being received and thus derive the bit rate of the incoming signal. The circuit 70 feeds a limiter 72 which eliminates the variations of amplitude on the pulse train which may be caused by the number of channels in use. The limiter feeds a blank gate 72, the purpose of which will be described later, and the blank gate feeds a five stage binary counter by means of an AND gate 73, the counter being composed of flip-flop stages 74, 75, 76, 77 and 78. This counter is similar to that described in connection with the group timing distributor shown in FIGURE 5, and counts the pulses from 1 to 24 in the same manner, the 24th pulse shifting both of the last two stages into the "1" condition so that an AND gate 79 will produce a potential to enable the AND gate 80 and permit the 25th pulse to reset all of the flip-flop stages 74 to 78 to "0" condition.

It is the purpose of the input circuitry to synchronize the counter 74–78 with the incoming pulse train. This incoming pulse train comprises a positive-going synchronizing pulse followed by a series of 24 channel time positions at each of which there may be a positive pulse or no pulse, depending on the delta-modulation signals on the channels. The incoming pulse train at terminal 66 is connected over a lead 81 to an inverter 82 which produces an output when no pulse is applied to it and no output when a pulse is applied to it. The output of this inverter feeds one input of an AND gate 83. The output of the gate 83 is connected to a pulse generator 84 which requires two inputs to operate. One of these inputs comes from the gate 83, while the other input comes from a delay bias 85 whose input is connected to the output of the gate 83. The delay bias 85 is arranged to produce an output only after it has received a predetermined number of pulses from the gate 83. A second input to the gate 83 is from a lead 86 which is connected to a source of positive potential, indicated at 87, over a resistor 88.

The stages 74 to 78 produce outputs when in the "0" condition which are delivered respectively to terminals 89, 90, 91, 92 and 93, while these stages produce outputs while in the "1" condition which are delivered respectively to terminals 94, 95, 96, 97 and 98. The terminals 89 to 93 are respectively coupled to the lead 86 by means of diodes 99, 100, 101, 102 and 103, all poled in the direction of easy current flow between the lead 86 and the stages.

When all of the stages are in the "0" condition, the diodes 99 to 103 will all be blocked and a positive potential will appear at the gate 83 over the lead 86. At any other time in the counting procedure at least one of the stages will be in the "1" condition and the diode associated with that stage will not be blocked and, hence, there will be no positive potential at the gate 83 from the lead 86.

If the counting stages are all at "0" when the synchronizing pulse is received, gate 83 will not open, because, although there will be a positive potential on its one input from the lead 86, the synchronizing pulse will produce no output from the inverter 82 at the input of gate 83. If the counter is not in phase with the input train, the stages will all be "0" at a time when the synchronizing pulse is not present. There will soon come a time when no pulse will appear at this time position because of the delta modulation, and when that occurs, a pulse will appear at the output of the inverter 82 and will coincide with the positive pulse from lead 86 at the input of gate 83. Thus, gate 83 will produce a pulse which will be applied to the delay bias 85, and the pulse generator 84. The pulse generator 84 will not immediately operate, since it requires another input from the delay bias, but the pulse applied to the delay bias will be stored therein, and at the next coincidence of these pulses, the gate 83 will again open and a second pulse will be applied to the delay bias 85 to add to the bias stored therein.

This process will be repeated, usually about every other pulse train, until the delay bias has accumulated enough charge to provide an input to the pulse generator 84. When this occurs, the pulse generator 84 will produce a pulse which will be delivered to the blank gate 72 to cause this gate to prevent a pulse from passing from the limiter 71 into the counter. The delay bias will be discharged during this procedure and the next pulse train from the input 66 will start the process over again.

Thus, each time a pulse is produced by the pulse generator, the counter will skip one count, and, hence, the position in the pulse train at which all stages of the counter will be "0" will be shifted from position to position until finally these stages will all be "0" at the time of the synchronizing pulse. When this occurs, a positive potential will appear at the gate 83 over the lead 86 and the positive synchronizing pulse will be inverted to appear as no pulse at the other input of gate 83, so that the gate will not open. The counter will then continue to count for each pulse produced by the one megacycle filter and will remain in synchronism with the incoming pulse train.

The incoming group clock will provide a pulse for each of the 24 line units of the group. To this end a plurality of AND gates, shown at the bottom of the figure and labeled 1 to 24, are provided. Each of these gates has five inputs and these inputs are connected to combinations of the terminals 89 to 98 in accordance with the binary counting of the counter, so that the gates 1 to 24 will be opened in succession. Thus, gate 1 has its inputs connected to the terminals 94, 90, 91, 92 and 93. These terminals are connected to the "1" side of stage 74 and the "0" side of each of the other stages, so that to open the gate 1, the stages would be set from right to left to represent the number 00001. Similarly, gate 24 has its five inputs connected respectively to terminals 89, 90, 91, 97 and 98 and would be opened when the counter represented 11000, reading from right to left. In whatever counting position the counter is at any given moment, corresponding line units will be supplied with a potential from the associated gate.

Figure 3:
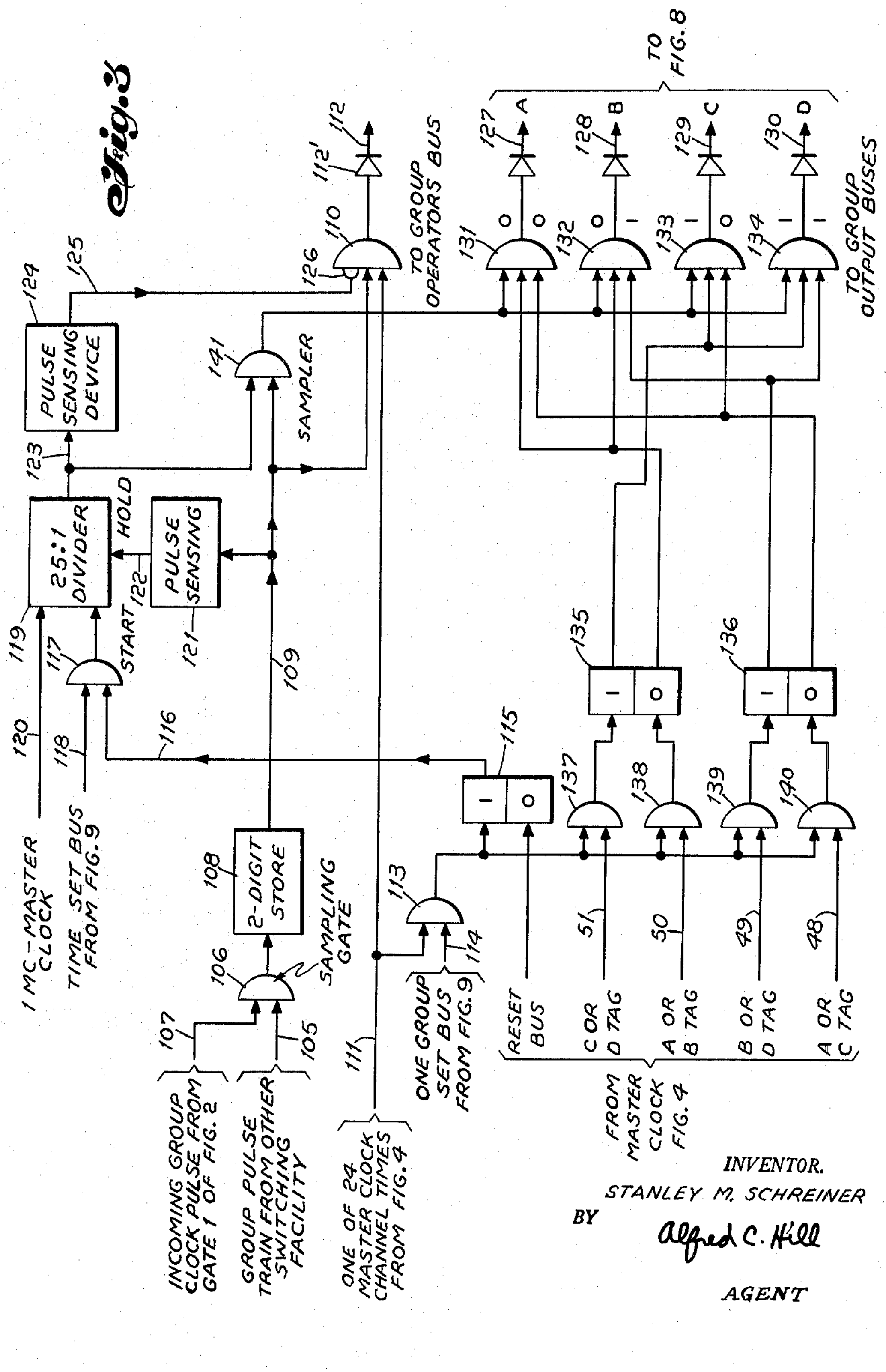
FIG. 3 is a block diagram more in detail of one of the line units comprised in the groups of FIG. 1.

There is a line unit 52 for each telephone and all have the same circuit. The circuit for the line unit of channel No. 8 of group A, for example, is shown in FIG. 3. The incoming pulse train is supplied over a lead 105, connected to lead 55 of FIG. 2, to sample AND gate 106 which has a second input which comes over lead 107 from the gate No. 8 of FIG. 2. The gate 106 will, therefore, only be enabled at the particular time position designated by the counter 74–78 of FIG. 2 over the gate No. 8 at the bottom of that figure, so that it samples the incoming pulse train at this particular time position. The gate 106 feeds into a two-digit store 108 which is provided in order to permit a difference in the timing between the calling party's time position and that of the called party. A two-digit store has been found satisfactory for delta-modulation signals. The output of the two-digit store 108 is delivered over a lead 109 to a gate 110 which opens at the time position determined by the master clock of FIG. 4, the time position in the particular case being time position No. 8 from the group timing distributor of FIG. 5 which is received over lead 111.

Figure 7:
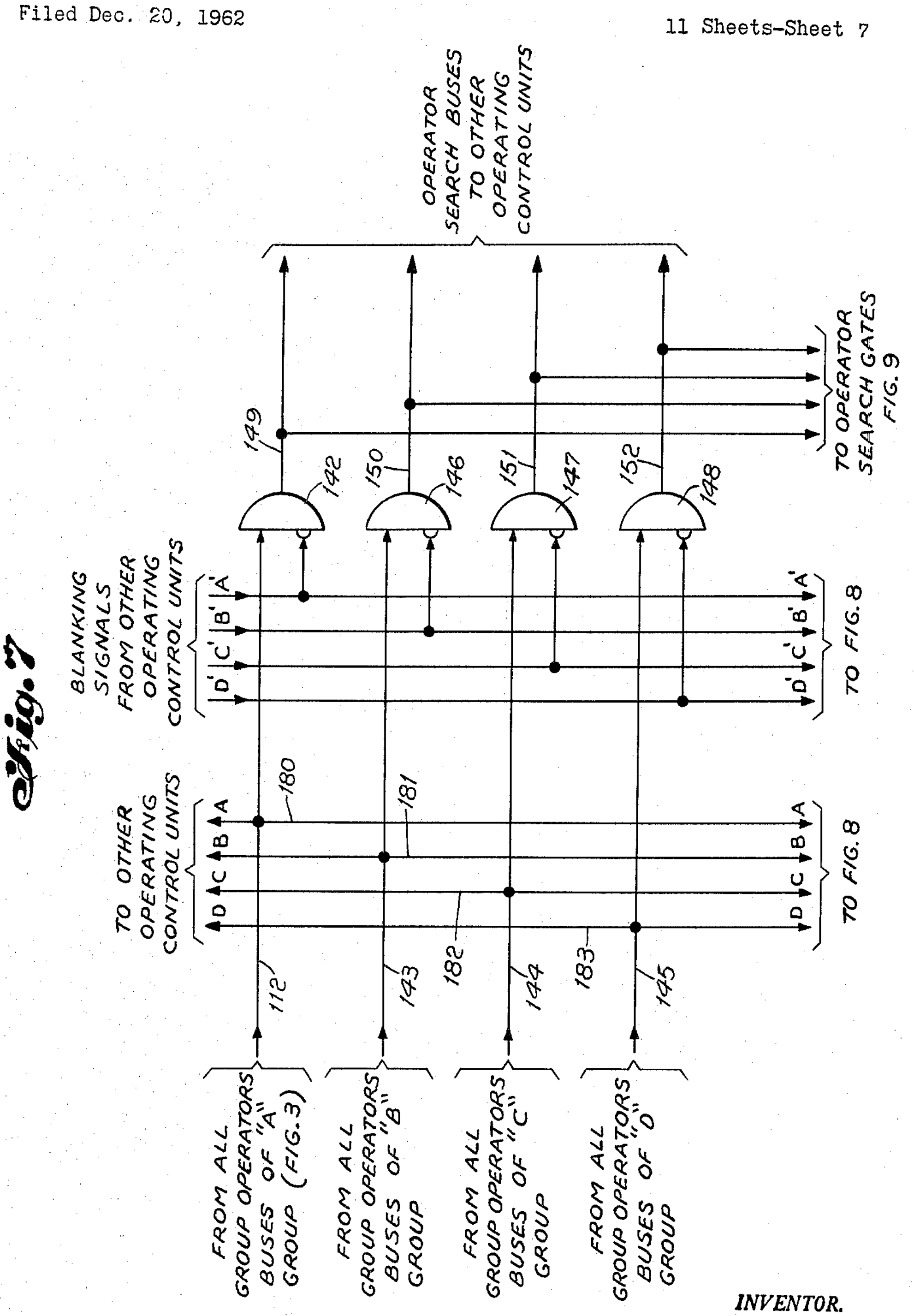
FIG. 7 is a circuit diagram of the group operator buses and blanking gates connecting the line units with the operating control units.

Since there may be a delay in the pulse transmission from one switching facility to another and a delay in various repeaters that the signal may pass through, it is necessary to store the incoming signal in the two digit store 108, so that it can be sent on its way at the corresponding time position which is exactly determined by the master clock. Thus, the gate 110 will open at the time position determined by the master clock and permit the signal from the store 108 to pass one to the group operator's bus 112. This bus will be individual to the particular group in which the calling telephone is situated, and the time position of the pulse on this group operator's bus will identify the calling telephone in the particular group. The group operator's bus 112 leads to all the operating control units, one of which is shown in FIGS. 7, 8 and 9 and will be later described. However, a signal on this particular group operator's bus 112 will indicate to a seized operating control unit that a call is originating from a telephone in this group, and the particular time position of the pulse on the bus will identify the calling telephone.

An important function of the line unit is to produce a signal pulse from the calling telephone on any selected channel of any selected group in order to connect the calling party to the called party. In order to accomplish this, an AND gate 113 has one input connected to the lead 111 from the master clock of FIG. 4, while its other input 114 is connected to one of the "group set" buses of the seized operating control unit of FIG. 9, and receives a potential in a manner to be described for a period of time which designates the group in which the called telephone is situated.

The output of the AND gate 113 is connected to a flip-flop 115 in a manner to cause the flip-flop to shift to the "1" condintion when the gate 113 supplies a pulse. The "1" output of the flip-flop 115 is connected over a lead 116 to one input of a start AND gate 117, and the other input of which is connected to the "time set" bus from the operating control unit of FIG. 9. This "time set" bus supplies the lead 118 with a pulse at the time position of the called party in a manner to be later described. This pulse is assumed to be at time position No. 16 representing channel No. 16. Thus, at the time position of the called channel in the time of the called party's group, the gate 117 will open and supply a 25 to 1 divider 119 with an enabling pulse. A second input 120 for the divider 119 is connected over lead 120 to the one megacycle output 3′ of the master clock shown in FIG. 4. The coincidence of the pulse which appears on this lead and the pulse received from the AND gate 117 will start the divider operating and it will continue operating under control of the master clock. Since the pulse from the gate 117 corresponds to channel No. 16, the divider 119 will produce an output at each 24th step exactly corresponding to channel No. 16 of the succeeding frames, and as long as the divider continues to count, the pulse corresponding to channel No. 16 will continue to be repeated. In order to stop the divider 119 when the call is completed, it is enabled by means of a pulse sensing device 121 which is connected to the lead 109, the pulse sensing device being connected to the divider over lead 122. As long as pulses appear on the lead 109, the pulse sensing device 121 enables the divider 119 and permits it to continue counting. When, however, the calling party hangs up and pulses no longer appear on the lead 109, the divider 119 will be disabled so that it will no longer produce pulses.

When the divider 119 starts producing pulses at the time position of channel No. 16 which represents the called line unit of the assumed example, the pulse sensing device 124 will produce a potential over the lead 125 which is applied to an inhibiting input 126 of the AND gate 110 to prevent pulses from passing through that gate over the group operator bus 112, since only a few pulses need be sent out over this bus in order to seize an operating control unit and identify the calling telephone, as will be later explained.

In order to transmit the signal from the calling party to the called party at the proper group time and at the proper time position in that group, four group output buses 127, 128, 129 and 130 are provided for groups A, B, C and D, and these buses are multipled to the operating control units, one of which is shown in FIGS. 8 and 9, as will be later described. In order to apply the pulse at the proper time position channel on the proper group output bus, each of these buses is provided with an AND gate, the gates being indicated at 131, 132, 133 and 134, and an isolating diode being provided between each bus and its associated gate.

In order to open the proper gate 131 to 134, a pair of flip-flops 135 and 136 are provided, these flip-flops being controlled by four AND gates 137, 138, 139 and 140. The gates 137 to 140 are enabled by each having an input connected to the output of AND gate 113, so that they are enabled at the time position of channel No. 16, for example, at the group time of group B, as determined by the "group set" bus from FIG. 9. The other inputs of the gates 137 to 140 are respectively connected over leads 51, 50, 49 and 48 to the tag leads of the master clock, shown at the lower left corner of FIG. 4. Thus, leads 49 and 50 are energized at the same time, and also at the same time the pulse representing channel 16 will be delivered from gate 113 to shift flip-flops 135 and 136 respectively to the "0" and "1" conditions. This will enable the AND gate 132 connected to the B group output bus 128. Then when a pulse appears from the divider 119 to the sampler gate 141, the digit stored in the store 108 will be passed through the AND gate 141 to the AND gate 132 and will pass out over the B group output bus 128 to the same bus of the operating control unit shown in FIG. 8.

From the above description of the line unit, it will be seen that a signal pulse train on the channel of the calling line will be transferred to the channel of the called line and will pass out over one of the group output buses corresponding to the group of the called line.

One of the four operating control units is shown in FIGS. 8 and 9, while the input circuits and blanking gates for this unit is shown in FIG. 7. In order to understand the operation of this operating unit, a call from a calling telephone to a called telephone in a different group will be described. For the purpose of this description, it will be assumed that the calling telephone has been assigned channel 8 and is in group A, while the called telephone will be assumed to be on channel 16 of group B.

When the calling party lifts his telephone, a pulse train will appear on lead 105 in FIG. 3 at the time position of his particular channel number, which in the description of FIG. 3 was assumed to be channel No. 8. This pulse will pass into the store 108, and since a pulse will appear on channel No. 8 from the master clock from FIG. 4, AND gate 110 will open and permit the pulse to pass through the isolating rectifier 112' to the group operator's bus 112. This group operator's bus 112 is shown at the top of FIG. 7 and the pulse train will pass over this bus to the input of a blanking gate 142. All of the group operator buses from the line units of the A group are connected to this particular group operator's bus. Similar group operators' buses 143, 144 and 145 are connected respectively to all of the line units in the B, C, and D groups. These buses 143, 144 and 145 are connected respectively to the inputs of the other blanking gates 146, 147 and 148. The gates 142, 146, 147 and 148 are arranged to pass a pulse as long as no potential appears on their respective inhibiting inputs 142', 146', 147' and 148'. These gates have their outputs connected respectively to operator search buses 149, 150, 151 and 152 which are multipled to the operator search gates 153, 154, 155 and 156, shown in the upper left corner of the operating control unit of FIG. 9.

When the pulse train appears on the group operator bus 112, it will pass through the blanking gate 142 to the operator search bus 149 from which it will be delivered to one input of the three-input operator search AND gate 153 (FIG. 9). Another input of this gate is connected over lead 157 to the AND gate 44 of the master clock, shown in FIG. 4. The corresponding other inputs of the operator search AND gates 154, 155, and 156 are similarly connected over leads 158, 159, 160 to the AND gates 45, 46, and 47 of FIG. 4. It will be remembered that these AND gates of the master clock are open in sequence at times corresponding to the group times, so that the search gates 153 to 156 are similarly enabled in sequence by potentials from the master clock. The gates 153 to 156 each have a third input which are all connected together and must be provided with a potential in order for any one of the gates to open. This potential is delivered over a lead 161 which is normally energized in a manner to be described later.

The incoming pulse over lead 149 then passes through AND gate 153 and is delivered over the lead 162 to flip-flop 163 (FIG. 8) which is one of four calling channel flip-flops, the others being indicated at 164, 165 and 166. Lead 162 is connected to the "1" input of the flip-flop, so that this flip-flop will shift to the "1" position to register the fact that the operating control unit has been seized by a call from group A. The other flip-flops 164 to 166 are similarly connected from the search gates 154 to 156 over respective leads 167, 168 and 169. The "0" outputs of the flip-flops 162 to 165 are connected to a four input AND gate 170, so that this AND gate will produce an output pulse only when the calling channel flip-flops are all in the "0" condition. The output of this AND gate 170 is connected to the lead 161 which is connected to the third input of each of the search gates 153 to 156, and since these search gates are enabled only when the calling channel flip-flops are all in the "0" condition, they will be blocked as soon as one of the calling channel flip-flops is set to the "1" condition.

The leads 162, 167, 168 and 169 from the search gates are also connected to the four inputs of an OR gate 171 (FIG. 9) whose output is connected over lead 172 to the start input of a first 25 to 1 divider 173 (FIG. 8). This divider is merely a counter which will count from 1 to 24 input pulses and will return to a "0" condition on the 25th pulse. It is similar to the 25 to 1 divider 119 in the line unit of FIG. 3. The purpose of this divider 173 is to create a train of pulses at the exact time position of the calling line. The divider is controlled and maintained in operation when once started by a pulse from the master clock over lead 174 which is connected to lead 3' of FIG. 4, and the pulse at the time position of the calling line over the lead 172 will start the divider at that time position so that it will continue to produce these channel pulses until stopped.

The operating control unit of FIGS. 8 and 9 is arranged to product pulses at the time position of the calling telephone and also pulses at the time position of the called telephone. The divider 173 produces the train of pulses at the time of the calling telephone. The divider 173 is normally not operating and is placed in this condition by a stop pulse delivered from the pulse generator 175. This pulse generator also delivers pulses over a lead 176 to the calling channel flip-flops 163 to 166 normally to set these flip-flops to their "0" condition. When in such condition, a potential will pass through the AND gate 170 over the lead 177 and through the OR gate 178 and a one-second delay line 179 to an inhibiting input 175' of the pulse generator 175. This stops the pulse generator 175 and removes the stop potential from the divider 173 to permit it to start when a pulse is received over one of the group operator buses 149 to 152. At the same time the reset potential is removed from the calling channel flip-flops 163 to 166 to permit one of them to operate.

After one of the calling channel flip-flops has been set to identify the group of the calling line, and the divider 173 has been started to produce repeated pulses at the time position of the calling channel, pulses at the search gates 153 to 156 are no longer needed and it is necessary to pick up these pulses at another point. Accordingly, the leads 180, 181, 182 and 183, shown in FIG. 7, are connected respectively to the group operator buses 112, 143, 144 and 145. These leads extend to inputs of sampling gates 184, 185, 186, 187, shown in FIG. 8. These sampling gates are AND gates and each has a second input, these latter inputs being connected respectively to the outputs of corresponding group time AND gates 188, 189, 190 and 191. Each of these gates has one input connected to the "1" output of the corresponding calling channel flip-flops 163 to 166. The other inputs of the gates 188 to 191 are connected together and to the output of the divider 173, so that a selected one of these gates is opened each time the divider 173 produces a pulse at the time of the calling channel. The outputs of the gates 188 to 191 are connected respectively over leads 192 to 195 to the other inputs of the sampling gates 184 to 187.

In the example being described, the divider 173 will produce its first pulse at the time position of channel No. 8, which pulse will pass through group time gate 188 and be delivered over lead 192 to sampling gate 184. Since a corresponding pulse on channel No. 8 will be delivered to lead 180 from the operator's bus 112 of FIG. 7, sampling gate 184 will open and permit this pulse to pass through an OR gate 196, which has inputs connected to the outputs of all of the sampling gates, to a pulse sensing device 197. This device is arranged to produce a pulse which will pass through the OR gate 178 and the one-second delay 179 to the inhibit input of the pulse generator 175. Thus, as soon as the potential from the gate 170 is cut off, by the shifting of the seized calling channel flip-flop, a pulse appears from the pulse sensing device 197 which prevents the divider 173 from being stopped.

The operating control unit is also provided with a dialing register and decoding matrix 198 which comprises well-known registering and decoding devices and has been shown as a rectangle in FIG. 8. This registering and decoding matrix has a number of functions: It is capable of receiving dial pulses representing the called party and including the group in which the called telephone is situated and the channel which has been allotted to the called party. It is arranged to select a time position of the called party from one of the 24 time positions fed to it from the master clock of FIG. 4. It is arranged to produce a pulse at the time position of the called party and to produce a signal when the dialing has been completed. It is also arranged to transmit stored dial pulses when the call is for a party at a distant point where the pulses must be transmitted over an outgoing trunk. All of these features are known in the art and it is unnecessary to explain them in detail in this application.

The pulse sensing device 197 received the calling pulse train, as has already been described and also delivers it to the dialing register and decoding matrix 198. When the dialing register and decoding matrix 198 receives the first pulse from the pulse sensing device 197 it produces a potential to be applied to a dial tone control lead 199 which enables an AND gate 200 shown in FIG. 9. Another input for this AND gate comes from the dial tone generator 201, so that the dial tone from generator 201 passes through the gate 200 and through an OR gate 202 to be delivered to the audio input of the No. 1 delta modulator 203. This delta modulator is arranged to produce the delta modulated signal to be transmitted back to the calling party. It is turned on at the time position of the calling channel by means of an inhibitor gate 204 having an input connected to the output of divider 173 over a lead 205. The gate 204 has an inhibitor input which is connected over lead 206 to a 60-second delay circuit 207 which in turn is connected to the output of the pulse sensing device 197. The delta modulator 203 will thus produce a delta modulated dial tone for a period of 60 seconds after the pulse sensing device 197 has received its first pulse at the time position of the calling channel from the group operator bus 112.

In order to transmit the output of the delta modulator 203 over the proper group lead to the calling line unit, four AND gates 208, 209, 210, and 211 are provided. One input of each of these AND gates is connected to the output of the delta modulator 203, while the other inputs are connected respectively over four calling group leads 212 to the respective outputs of the calling channel flip-flops 163 to 166 in their "1" conditions. Thus, the flip-flop which has been switched to the "1" condition, namely, flip-flop 163 in the example under consideration, will enable the AND gate 208 and permit the delta modulated dial tone signal to pass through the gate 208 and through an isolating diode to the lead 213 which is connected to the input terminal of the calling party's input circuit, such as terminal 66, FIG. 2, which delivers the dial tone to the appropriate line unit, the eighth line unit in the example employed herein, which is enabled by the sampling pulse output of gate No. 8.

He will then start to dial the called number. The calling pulses will appear on channel No. 8 of group A and will be applied to lead 105 in the associated line unit circuit of FIG. 3; the signals will pass through the sampling gate 106 to the digit store 108 and will be applied to the AND gate 110 to which a pulse from the master clock over lead 111 will be simultaneously applied. The output of gate 110 then passes through the diode 112' to the group operator bus 112 and to the blanking circuit, shown in FIG. 7, the lead 112 on this figure being connected to lead 180 which leads to the operating control unit of FIG. 8. Here it is applied to the AND sampling gate 184 together with a pulse supplied by the divider 173 through the group time gate 188 and at the time position of channel No. 8. The pulse then passes from the AND sampling gate 184 through the OR gate 196 to the pulse sensing device 197 from which it passes to the dialing register and decoding matrix 198. As already explained, this apparatus receives and stores the dialing pulses and performs any necessary decoding function.

It is assumed that the called number represents a telephone which has been allotted channel No. 16 in group B. The dialing register 198 has four output leads 217, 218, 219 and 220 which represent respectively the A, B, C and D groups. Since the called number is in group B, the register will apply a potential to the B lead 218. At the same time, and as the first dialing pulse is received, the potential on the dial tone control lead 199 is cut off which closes the gate 200 in FIG. 9 and stops dial tone from passing to the delta modulator 203 and thus cuts off the dial tone from the calling telephone.

After the dialing has been completed, it is necessary to test the called line to determine whether or not it is free, and to accomplish this, a potential appears on lead 221 indicating that the dialing has been completed. This lead 221 feeds an AND gate 222 and enables the gate so that the called channel time, in this case, channel No. 16, which appears on lead 223 may pass through gate 222 and start the second 25 to 1 divider 223 which thereupon repeatedly produces a pulse at the time position of channel 16.

The lead 218, which represents the B group, then delivers its potential over the corresponding lead on FIG. 9 to the diode matrix, shown in the lower right hand corner of that figure. The lead 218 is connected to another lead 224 (FIG. 8) which delivers the potential to one input of an OR gate 225. The other leads 217, 219, and 220 are similarly connected to inputs of this OR gate. The output of this OR gate passes over lead 226 to enable two AND gates 227 and 228 which are respectively the "set called gate" and "set caller gate." At the same time, the called channel pulse, No. 16 in this case, from the second divider 223 passes over lead 226a to AND gate 229 which is associated with the B group. This gate requires three coincident inputs: one from the divider over lead 226a, one from the B called channel group over lead 224, and one over the group output bus lead 128 corresponding to the B group, as shown in FIG. 3. Similar AND gates are provided for groups A, C, and D.

If channel No. 16 of the B group is busy, a pulse will appear at this time position on the group output bus 128, and, if this is the case, the AND gate 229 will produce a pulse which will pass through the OR gate 230 to a flip-flop circuit 232 to shift that flip-flop to the "1" condition. The No. 16 pulse from the divider 223 is also delivered over lead 226a to a ½ second delay circuit 233. At the end of the half second delay, the pulse is delivered over a lead 234 to an AND gate 235 which is enabled by the flip-flop 232 being in the "1" condition. Thus, the pulse passes through the gate 235 and through an OR gate 236 and over lead 237 to FIG. 9 where it enables an AND gate 238 whose other input is connected to the busy signal generator 239. The gate 238, therefore, opens and delivers the busy signal to the OR gate 202 from which it passes into the delta modulator 203. Since the delta modulator 203 is enabled at the time position of channel No. 8 over lead 205, and the AND gate 208 is open, the busy signal will pass over lead 213 to the line unit of the calling telephone. The calling party will then hang up.

Assume now that the called party is free. In this case, there will be no pulse on channel No. 16 time position on the group output bus 128 from the line units. Because of this, the AND gate 229 will not open and the flip-flop will remain in its "0" condition. When the pulse at channel No. 16 time position passes from the delay device 233, it will open an AND gate 240 whose second input has a potential applied to it from the flip-flop 232 in its "0" condition. The output of AND gate 240 will shift the flip-flop 241 to its "1" condition which will deliver a potential to both gates 227 and 228. These gates are three-input AND gates, and since gate 227 has its three inputs energized, it will open and deliver a potential over the set called lead 242.

Since the called telephone is not busy, it is now necessary to set the calling party's line unit to the called parties' group and channel. This is accomplished by means of the matrix of diodes shown on the right side of FIG. 9. If the matrix were arranged in a known manner to connect any telephone with any other telephone in the system by means of the matrix itself, a very large number of diodes would be necessary. By providing the line units which can be set to the other party's group and channel, the number of diodes which are necessary in the operating control unit is very greatly reduced.

The setting of the line unit is accomplished in the following manner: In the present example, the matrix comprises 24 verticals and 18 horizontals. The horizontals are numbered 1 to 18 at the right side of the figure. Each of these horizontals is connected through a resistor, indicated generally at 245, to a positive source of potential indicated at 246.

Certain of the verticals are connected to other parts of the system shown in other figures, while the remaining verticals are connected within the operating control unit. Vertical 247 receives the time sharing signal from the lead marked "1st" connected to the AND gate 40 of the master clock of FIG. 4, assuming that the operating control unit shown in FIGS. 8 and 9 is the first operating control unit. As has been explained in connection with FIG. 4, the leads from the gates 40 to 43, shown at the lower right corner of FIG. 4, receive potentials in succession, so that the operating units are enabled in succession.

The vertical 247 is connected over diodes 247' to horizontals 9 to 18, the diodes being poled for easy flow of current towards the horizontals, so that when the potential appears on that vertical, these horizontals may be made positive, providing the other diodes connected to them are similarly blocked. The verticals 248, 249, 250 and 251 are connected respectively to the incoming group tags 157 to 160 from the master clock of FIG. 4, in order to energize these group verticals in succession. These verticals are connected respectively to horizontals 1, 2, 3, 4 and 5, 6, 7 and 8 over diodes 248' to 251'.

Four outgoing group setting buses are connected to verticals 252, 253, 254 and 255 and lead to the line units of FIG. 3. Thus, all of the line units in group A have the lead 114 connected to the group setting bus A which is represented by the vertical 252 of the matrix. Similarly, all of the line units of groups B, C and D are connected respectively to the verticals 253, 254 and 255 of the matrix. A positive potential appearing on vertical 252 will inform the particular line unit of group A that it is to be set to the particular group corresponding to the time the potential appears on the vertical 252.

An outgoing vertical 256 is connected to the time set bus of all line units at lead 118 of FIG. 3. A pulse on this vertical 256 at a particular time position will inform the line unit of the channel on which it is to be set.

The group setting verticals 252 to 255 are connected respectively to horizontals 9, 10, 11 and 12 and also respectively to horizontals 13, 14, 15 and 16 over diodes indicated at 252'. The diodes connecting verticals 252 to 255 to the horizontals are poled in the direction to permit easy current flow from the horizontals to the verticals and, thus, out to the line units.

The vertical 256 is connected by diodes 256' to horizontals 17 and 18, poled so as to permit current to flow from the horizontals 17 and 18 to the vertical 256 and, thus, out to the time set bus of FIG. 3 on all line units.

The set caller gate 228 is connected over a lead 257 to a vertical 258 which is connected over diodes 258' to horizontals 9, 10, 11, 12 and 17. Thus, when the called line is free, a potential is supplied over this lead to the vertical 258.

The set called lead 242 from the set called gate 227 is connected to the vertical 259 which in turn is connected to horizontals 13, 14, 15 and 16 over diodes 259'.

The calling time from the divider 173, in this case channel No. 8, is supplied from lead 205 over lead 260 to vertical 261 which is connected over diodes 261' to horizontals 9, 10, 11, 12 and 18.

The called time, in this case channel No. 16, is supplied from the divider 223 over lead 262 to vertical 263 which is connected by diodes 263' to horizontals 13, 14, 15, 16 and 17.

The called channel group leads 217 to 220 from the dialing register and decoding matrix 198 are connected respectively to verticals 264, 265, 266 and 267. These verticals are connected respectively to horizontals 1, 2, 3 and 4 over diodes 264' to 267' and also respectively to horizontals 13, 14, 15 and 16 over diodes 264'' to 267''.

The calling group leads 212 which are connected to the calling channel flip-flops 163 to 166 in the "1" condition are connected to verticals 268, 269, 270 and 271, these verticals being connected respectively over diodes 268' to 271' to horizontals 5, 6, 7 and 8 and also respectively to horizontals 9, 10, 11, and 12.

There are two auxiliary verticals 272 and 273. Vertical 272 is connected to horizontals 1, 2, 3, 4, 9, 10, 11 and 12 by means of diodes 272', poled so as to permit current flow from the horizontals to the vertical. Vertical 273 is connected to horizontals 5, 6, 7, 8, 13, 14, 15 and 16 over diodes 273'.

The verticals 272, 273, 252, 253, 254, 255 and 256 are also connected through individual resistors, indicated at 274, to a lead 275 which is connected to a negative source of potential, indicated at 276.

In the operation of this connecting matrix, it will be assumed that the line corresponding to channel No. 16 of group B has been called and the line has been tested and found free. The next step is to set the calling line unit to the group and line unit of the called party. With the called line unit free, this means that when the delay circuit 233 of FIG. 8 produces an input for the gate 240, the flip-flop 232 is still in the "0" condition and is energizing the other input to the gate 240. Thus, the gate 240 produces an output and sends the flip-flop 241 into the "1" condition. The set caller gate 228 will then be opened, since one input is energized from the flip-flop 241 in the "1" condition, another is energized from the OR gate 225 which receives its potential from the called channel B group lead 218, and the third input is energized by the flip-flop 232 being in the "0" condition. Thus, a potential is applied over the set caller lead 257 to the vertical 258 of the matrix to block all of the diodes connected to that vertical. At the same time, a potential appears on the called channel group lead 218, corresponding to the B group from the dialing register and decoding matrix 198. This potential is applied to the vertical 265, representing the B group. This will block the diode connected to horizontal 2. At group B time, a potential also appears on the lead 158 from the master clock of FIG. 4 and, therefore, on vertical 249 and blocks the diode leading to horizontal 2. A potential at group B time is thus placed on horizontal 2, since both diodes leading to this horizontal are blocked by potentials on verticals 265 and 249.

The potential on horizontal 2 passes through the diode 272′ connecting it with the auxiliary vertical 272, thus placing a positive potential at group B time on this vertical. This blocks the diode between vertical 272 and horizontal 9. The diode between horizontal 9 and the time sharing signal vertical 247 is blocked by the signal on that vertical. The diode between horizontal 9 and the set caller vertical 258 is also blocked. Also the diode between horizontal 9 and the calling time vertical 261 is blocked at the time of channel No. 8. Also the diode connecting horizontal 9 to the vertical 268 which has a potential on it from the calling line channel flip-flop 163 is blocked. And the diode between horizontal 9 and the vertical 272 is also blocked, as has already been stated at group B time. Thus, a positive potential on horizontal 9 at a group B time and at No. 8 channel time position passes through the diode 252′ leading to the A group vertical 252 and appears on the group set bus lead 114 (FIG. 3) of all the line units of group A.

This will set the flip-flop 115 in the calling line unit to the "1" condition and thus enable the start gate 117, since this is the only line unit of group A with No. 8 channel pulse on its lead 111. The signal on lead 114 will appear at the time of the B group, as determined by the pulse on the group tag lead 158 from the master clock being delivered to the vertical 249 of the matrix of FIG. 9. At the same time, the A or B tag from the master clock will apply a potential to lead 50 in FIG. 3 and the B or D tag also from the master clock will deliver a potential over lead 49. The potentials on these leads 49 and 50 will cause the flip-flop 136 to shift to the "1" position from the output of gate 139 and the flp-flop 135 to shift to the "0" condition, or remain in that condition. from the output of gate 138. With these two flip-flops in the conditions mentioned, gate 132 will be enabled to produce an output over the group output bus 128 which is the B bus, thus preparing the calling line unit to send a signal to a line unit in the B group.

Referring again to FIGS. 8 and 9, the second divider 223 of FIG. 8 is producing a train of pulses at the time position No. 16 of the called line, and this train of pulses is delivered over lead 262 to the called time vertical 263 of FIG. 9. At the same time, a potential is still present from the set caller gate on vertical 258. This potential, in coincidence with the No. 16 channel pulse on the called time vertical 263, places a positive pulse at No. 16 time position on horizontal 17 by blocking the diodes connected between those verticals and horizontal 17. This pulse on horizontal 17 passes over the diode 256′, connecting that horizontal with vertical 256, to apply the pulse to that vertical which is the time set bus leading to all of the line units.

Accordingly, the time set bus 118 of the calling line unit of FIG. 3 will receive a pulse at the No. 16 channel time. Since the flip-flop 115 of the calling line unit of FIG. 3 is in the "1" condition, the start gate 117 will open to start the divider 119 which will thereafter produce a train of pulses at the called time position of channel No. 16. This will complete the enabling of the gate 132 at the lower right corner of FIG. 3, so that a pulse at the No. 16 channel time position will pass over the group output bus 128 at the time of the B group. This pulse will have the calling signal on it, this signal being taken from the two digit store 108 through the sampler gate 141.

The signal will pass from the group output bus 128 to the input circuits of group B, which are identical to the circuits shown in FIG. 2, and will be received on input terminal 66 where it will be delivered to the line unit of channel No. 16 and thence to the called telephone assigned to that channel.

The next step is to set the called line unit, which, in the example, is that line unit in group B to which the No. 16 time position channel has been allotted, to the calling line group and time position in that group, namely group A and time position No. 8. This is accomplished as follows:

As soon as the signal appears on channel No. 16 on the B group output bus 128 of FIG. 8, the AND gate 229 will open, since this gate receives the No. 16 channel input pulse from the divider 223 on one input and the B group potential over lead 224 from the dialing register and recorder 198 on another input. This pulse will pass through the OR gate 230 to shift the flip-flop 232 to the "1" condition.

Both of the flip-flops 232 and 241 are now in the "1" condition, and this will open the "set called gate" 227 to deliver a potential over the lead 242 from FIG. 8 to the set called vertical 259 of the matrix in FIG. 9. At the same time, a pulse at the time of the calling party channel No. 8 is delivered over lead 205 and lead 260 to the calling time vertical 261. With potentials on both verticals 259 and 261, the diodes connected to horizontal 18 are blocked, so that a positive pulse appears on this horizontal which passes through the diode 256′ connected between this horizontal and the time set bus vertical 256 to apply the positive pulse on vertical 256 at the time of channel No. 8.

This time set bus vertical 256 is connected to all line units. Hence lead 118 of the called line unit of FIG. 3 will receive this pulse at the time of channel No. 8.

A potential is still being supplied from the flip-flop 163 of FIG. 8 over the A group lead 212 to the calling A group vertical 268 of FIG. 9. When the potential from the A group tag 157 appears from the master clock, on vertical 248 both diodes connected to the No. 5 horizontal are blocked and a potential at the group A time appears thereon. This is transferred to auxiliary vertical 273 where it blocks the diode connected between it and horizontal 14. All but one of the other diodes connected to this horizontal are blocked. There is a blocking potential on the setting bus time sharing signal vertical 247, as already explained. The set called vertical 259 has a potential from the lead 242 which blocks the diode connected to it. The called time vertical 263 has a pulse thereon at time position No. 16 from the divider 223 which blocks the diode connected to it. And the called group B vertical 265 has a potential from the B group lead 218 of the dialing register and recorder matrix 198 which blocks the diode connected between it and horizontal 14. A pulse at time position No. 16 will therefore appear on horizontal 14 which is transferred to the B group setting bus vertical 253 over one of the diodes 252' and will pass to all the line units of group B.

The called line unit of FIG. 3 will have a pulse on its lead 111 at the No. 16 time position, and when the pulse at No. 16 time position from the group set vertical 253 of FIG. 9 appears on lead 114, the gate 113 will open and shift flip-flop 115 to the "1" condition.

Since the AND gate 117 has been enabled by the shift of the flip-flop 115, the divider 119 in the called line unit will operate to produce a train of pulses at the time position of channel No. 8.

Since the pulse on lead 114 from the group set bus 253 of FIG. 9 is at the time of group A, it will coincide with pulses on the A or B tag 50 from the master clock of FIG. 4 and also the A or C tag 48 from the master clock. This will open gates 138 and 140, thus setting flip-flops 135 and 136 each to the "0" condition.

When the pulse from the divider 119 at the No. 8 channel time position reaches the sampler AND gate 141, this gate will open to transfer the signal from the user's telephone which has been stored in the two digit store 108 to the AND gate 131 which will send the signal out over the A group output bus 127 at the time position of the calling party which is channel No. 8.

From the above it will be seen that the line unit associated with the calling party has been set to produce pulses during the time of group B which is the group of the called party and at the time position of channel No. 16 which is the channel of the called party. The line unit of the called party has also been set to produce signals during the time of group A, the calling party, and at the time position of channel No. 8 which is the time position of the calling party. The operating control unit is now no longer needed and the two parties can converse directly between the two line units and the operating control unit is free to handle another call.

The operating control unit of FIGS. 8 and 9 is returned to its normal condition by means of the pulse generator 175 already referred to. As long as a potential appears on the inhibit input 175' of this pulse generator, it will not operate. This potential will be applied to this inhibit input as long as the calling channel flip-flops 163 to 166 are in their "0" condition. This produces an output from the AND gate 170 which passes over the lead 177 and through the OR gate 178 and the one second delay circuit 179 to the input 175'. When one of the calling channel flip-flops is set, this potential is blocked by the AND gate 170, but by this time a pulse over the group operator's bus from the calling line unit of FIG. 3 will pass through the sampling gate 184 and the OR gate 196 to the pulse sensing device 197 which in turn passes a pulse through the OR gate 178 to the one second delay circuit 179. Therefore, the pulse generator 175 is still prevented from operating. However, when the calling line unit has been set, the pulse disappears from the group operator's bus 112 leading from the line unit because of the operation of the pulse sensing device 124 of FIG. 3 which produces an inhibiting pulse on the inhibit input 126 of the AND gate 110 of FIG. 3. Since there is no longer any potential applied to the one second delay circuit 179, the pulse generator 175 will no longer receive its inhibiting potential and will operate to stop the divider 173 and the divider 223, and will shift the calling channel flip-flop 163 and the flip-flops 241 and 232 back to their "0" conditions. The one second delay 179 provides sufficient time for the line unit of the called party to be set before returning the operating control unit to its normal condition.

From the above it will be seen that I have provided a time division switching system especially useful in digital grid systems in which the connecting matrix in the operating control unit is greatly simplified by means of line units individual to each of the lines which can be set by the operating control unit to the particular group and channel number of the line unit to which it is connected.

While I have described above the principles of my invention in connection with specific apparatus, it is to be clearly understood that this description is made only by way of example and not as a limitation to the scope of my invention, as set forth in the objects thereof and in the accompanying claims.

I claim:

1. A digital switching system comprising:

(a) a plurality of lines, each line being assigned a time position in a repetitive train of time positions, (b) a separate line unit connected to each line, (c) settable transmitting means in each line unit for transmitting signals from the associated line at any selected time position in said repetitive train at which said transmitting means is set, and (d) means common to all said line units for setting the settable transmitting means in any two of said line units, each to the time position of the other, in response to signals received by said common means from one of them.

2. A digital switching system, as defined in claim 1, in which the lines are divided into groups, and in which the common means for setting the settable transmitting means in the line units comprises:

(a) means responsive to signals from a calling line unit for transmitting signals to a selected line unit representing the group of a called line unit and the time position in that group, and (b) means in each line unit responsive to signals from said common means to set the settable transmitting means in said line unit to transmit at the group time and the time position in that group represented by said signals.

3. A digital switching system, as defined in claim 2, further comprising:

(a) a master clock in said common setting means adapted to produce a train of pulses corresponding to the train time positions in the repetitive train of time positions, (b) means in each line unit forming part of the settable transmitting means for counting the pulses of said master clock and producing a pulse for each number of pulses corresponding to the number of time positions in said train, and (c) means responsive to the signals received from said common means for starting said counting means at a time corresponding to the time position at which said line unit is to be set.

4. A digital switching system, as defined in claim 1, in which the common means comprises:

(a) a switching matrix having a coordinate wire multipled to all line units, and (b) means in said matrix for applying a train of pulses at the time position of a selected line unit for seizing said line unit.

5: A digital switching system, as defined in claim 4, in which the lines are divided into groups, further comprising:

(a) a coordinate wire for each group in the matrix of the common means, each of said wires being connected to all the line units of its respective group, (b) means for applying a signal to one of said coordinate wires representing a group in which a line is to be selected, (c) a plurality of output leads associated with each of the line unit settable transmitting means, one for each of said line groups, and (d) means connected with each of said settable transmitting means for selecting one of said output leads in response to a signal received from said common means for transmitting signals in the selected time position over the selected group lead.

6. A digital switching system, as defined in claim 5, further comprising:

(a) a master clock in the common setting means adapted to produce a train of pulses at the time positions of the train of time positions,
(b) means in each line unit, forming part of the settable transmitting means, for counting the pulses of said master clock and producing a pulse for each number of pulses corresponding to the number of time positions in said train of time positions, and
(c) means responsive to the signals received from said common means for starting said counting means at a time corresponding to the time position in the group at which said line unit is to be set.

7. A digital switching system, as defined in claim 6, in which the common means further comprises:
(a) a first counter adapted to count a number of clock pulses corresponding to the number of time positions in the repetitive train of time positions,
(b) means responsive to a calling signal from a line unit for starting said first counter, so as to cause it to produce a train of pulses at the time position of the calling line,
(c) a second counter similar to said first counter,
(d) means for registering the identity of the group and time position in that group of a called line unit,
(e) means controlled by said registering means for starting said second counter, so as to produce a train of pulses at the time position of the called line,
(f) means controlled by said first counter for transmitting signals over said matrix to said called line unit for setting said called line unit to the group and time position of said calling line, and
(g) means controlled by said second counter for causing said matrix to produce signals for setting said calling line unit to the group and time position of said called line.

8. A digital switching system comprising:
(a) means for receiving a train of pulses including a framing pulse and spaced information pulses representing information channels,
(b) clock means connected to said receiving means for producing a plurality of sampling pulses with the same spacing as said information pulses, there being one for each information pulse,
(c) means controlled by the received pulse train including said framing pulse for maintaining the sampling pulse produced by said clock means in phase with the incoming pulse train,
(d) a plurality of line units, there being one for each information channel,
(e) means for applying the sampling pulses produced by said clock means to corresponding ones of said line units,
(f) a plurality of operating control units,
(g) means in each line unit responsive to the received sampling pulse for transmitting the information pulses corresponding to that sampling pulse to all of said operating control units,
(h) means in each operating control unit responsive to the receipt of a pulse from a line unit for seizing that line unit and for producing a blanking signal for preventing other operating control units from seizing that line unit,
(i) means in each operating control unit responsive to the receipt of a pulse from a line unit and controlled by said seizing means for transmitting a dial tone to said line unit,
(j) registering and decoding means in each operating control unit adapted to receive dialing pulses from a line unit and to register the called number represented by said pulses and to select the group of channels and particular channel in the group determined by said registered number,
(k) means responsive to the first dialing pulse received by said registering and decoding means for blocking said dial-tone transmitting means,
(l) a switching matrix in each operating control unit connected to all of said line units,
(m) means in each operating control unit for causing said switching matrix to produce first signals identifying the time position of a calling line unit,
(n) means controlled by said first signals from said switching matrix for setting the called line unit to transmit at the time position of said calling line unit,
(o) means in each operating control unit for causing said switching matrix to produce second signals identifying the time position of a called line unit, and
(p) means controlled by said second signals from said switching matrix for setting the calling line unit to transmit at the time position of the called line unit.

9. A digital switching system comprising:
(a) a plurality of lines, each line being assigned a time position in a repetitive train of time positions,
(b) a separate line unit connected to each of said lines,
(c) settable means in each line unit for producing a train of pulses at any selected time position within said time-position train,
(d) an operating control unit common to said lines and connected to said line units,
(e) means in said operating control unit for receiving a train of pulses from a calling line unit and for identifying the time position thereof,
(f) registering means in said operating control unit for registering information included in a received train of pulses representing the time position of the called line,
(g) means in said operating control unit controlled by said registering means for transmitting signals to said calling line unit for setting the settable means therein to produce a train of pulses at the time position of the called line,
(h) means in said operating control unit also controlled by said registering means for selecting and seizing the line unit of the called line,
(i) means in said operating control unit controlled by said identifying means for transmitting signals to said called line unit for setting the settable means therein to produce a train of pulses at the time position of said calling line, and
(j) means in each line unit for transmitting signals originating at the associated line at the same time positions of the train of pulses produced by said line unit.

10. A connecting matrix for a digital switching system having a plurality of line units arranged in groups, said matrix comprising:
(a) a first set of coordinate wires, certain of said wires being individual to each group of line units and one of said wires being common to all said line units,
(b) a second set of coordinate wires crossing the wires of said first set,
(c) means responsive to signals received on a combination of the other wires of said first set for applying via a wire of said first set a potential for a selected time position in a succession of trains of such time positions on a selected one of said certain wires of said first set corresponding to a selected group of line units, said timed potential identifying said group, and
(d) means responsive to signals received on a different combination of the other wires of said first set for applying a potential for another selected time position on said common one of said wires of said first set.

No references cited.

ROBERT H. ROSE, *Primary Examiner.*

WILLIAM C. COOPER, *Examiner.*